(12) United States Patent
Simundic (10) Patent No.: US 12,539,411 B2
(45) Date of Patent: Feb. 3, 2026

(54) CONTROL FOR NON-OCCLUSIVE BLOOD PUMPS

(71) Applicant: Xenios AG, Heilbronn (DE)

(72) Inventor: Ivo Simundic, Wendlingen (DE)

(73) Assignee: Xenios AG, Heilbronn (DE)

( * ) Notice: Subject to any disclaimer, the term of this patent is extended or adjusted under 35 U.S.C. 154(b) by 777 days.

(21) Appl. No.: 17/625,622

(22) PCT Filed: Jul. 8, 2020

(86) PCT No.: PCT/EP2020/069310
§ 371 (c)(1),
(2) Date: Jun. 8, 2022

(87) PCT Pub. No.: WO2021/005133
PCT Pub. Date: Jan. 14, 2021

(65) Prior Publication Data
US 2022/0313889 A1 Oct. 6, 2022

(30) Foreign Application Priority Data
Jul. 10, 2019 (DE) .......................... 102019004825.3

(51) Int. Cl.
*A61M 60/232* (2021.01)
*A61M 1/36* (2006.01)
(Continued)

(52) U.S. Cl.
CPC ........ *A61M 60/232* (2021.01); *A61M 1/3639* (2013.01); *A61M 1/3666* (2013.01);
(Continued)

(58) Field of Classification Search
CPC .............. A61M 60/232; A61M 60/531; A61M 60/419; A61M 60/221; A61M 60/546;
(Continued)

(56) References Cited

U.S. PATENT DOCUMENTS

| | | | |
|---|---|---|---|
| 2007/0083077 A1 | 4/2007 | Frazier | |
| 2010/0150759 A1* | 6/2010 | Mazur | F04B 43/0072 417/477.13 |

(Continued)

FOREIGN PATENT DOCUMENTS

| | | |
|---|---|---|
| EP | 2832383 | 2/2015 |
| EP | 3287154 | 10/2019 |

(Continued)

OTHER PUBLICATIONS

International Search Report and Written Opinion in International Appln. No. PCT/EP2020/069310, mailed Jan. 13, 2021, 24 pages (with English translation).

*Primary Examiner* — Jessica Arble
(74) *Attorney, Agent, or Firm* — Fish & Richardson P.C.

(57) ABSTRACT

The present disclosure pertains to control units for non-occlusive blood pumps of an extracorporeal circulatory support as well as systems comprising such a control unit and corresponding methods. Accordingly, a control unit for a non-occlusive blood pump of an extracorporeal circulatory support is configured to receive a flow value of the extracorporeal circulatory support, to receive a measurement of an arterial pressure and an ECG signal of a supported patient over a predetermined period of time, to determine a mean arterial pressure of the extracorporeal circulatory support or of the supported patient from the measurement of the arterial pressure and an energy equivalent pressure from the flow value and the arterial pressure.

30 Claims, 4 Drawing Sheets

(51) Int. Cl.
  *A61M 60/113* (2021.01)
  *A61M 60/221* (2021.01)
  *A61M 60/38* (2021.01)
  *A61M 60/419* (2021.01)
  *A61M 60/515* (2021.01)
  *A61M 60/523* (2021.01)
  *A61M 60/531* (2021.01)
  *A61M 60/546* (2021.01)
  *A61M 60/569* (2021.01)
  *A61M 60/849* (2021.01)

(52) U.S. Cl.
  CPC ........ *A61M 60/113* (2021.01); *A61M 60/221* (2021.01); *A61M 60/38* (2021.01); *A61M 60/419* (2021.01); *A61M 60/515* (2021.01); *A61M 60/523* (2021.01); *A61M 60/531* (2021.01); *A61M 60/546* (2021.01); *A61M 60/569* (2021.01); *A61M 60/849* (2021.01)

(58) Field of Classification Search
  CPC .. A61M 60/38; A61M 60/849; A61M 60/113; A61M 60/523; A61M 60/515; A61M 60/569; A61M 1/3639; A61M 1/3666; A61M 60/133; A61M 60/109; A61M 2205/3334; A61M 1/3621; F04B 53/00; F04B 43/0072; F04B 43/1215
  See application file for complete search history.

(56) References Cited

U.S. PATENT DOCUMENTS

| | | | |
|---|---|---|---|
| 2013/0006130 A1* | 1/2013 | Olde | A61M 1/3659 600/504 |
| 2013/0023776 A1* | 1/2013 | Olde | A61M 1/3639 600/487 |
| 2013/0101452 A1* | 4/2013 | Mazur | F04B 53/00 138/119 |
| 2015/0030502 A1* | 1/2015 | Gorhan | A61M 60/232 604/151 |
| 2015/0141911 A1* | 5/2015 | Bulent | A61M 60/109 604/154 |
| 2016/0166749 A1* | 6/2016 | Wiktor | A61M 60/37 604/6.11 |
| 2016/0220749 A1* | 8/2016 | Heide | A61M 1/3624 |
| 2018/0311422 A1* | 11/2018 | Greatrex | F04D 29/048 |
| 2020/0086022 A1* | 3/2020 | El Katerji | A61M 60/216 |
| 2021/0154386 A1* | 5/2021 | Nürnberger | A61M 1/3656 |

FOREIGN PATENT DOCUMENTS

| | | | | |
|---|---|---|---|---|
| JP | 2009-518070 | 5/2009 | | |
| JP | 2015-027458 | 2/2015 | | |
| WO | WO-2007041801 A1 * | 4/2007 | .......... | A61M 1/1037 |

* cited by examiner

CONTROL FOR NON-OCCLUSIVE BLOOD PUMPS

CROSS-REFERENCE TO RELATED APPLICATIONS

The present application is the national stage entry of International Patent Application No. PCT/EP2020/069310, filed on Jul. 8, 2020, and claims priority to Application No. 102019004825.3, filed in the Federal Republic of Germany on Jul. 10, 2019, the disclosures of which are expressly incorporated herein in their entireties by reference thereto.

TECHNICAL FIELD

The present disclosure relates to control units for non-occlusive blood pumps of an extracorporeal circulatory support as well as systems comprising such a control unit and corresponding methods.

BACKGROUND

If the pumping capacity or pumping function of the heart fails, cardiogenic shock may occur, which due to a reduction in cardiac output or ejection may lead to a reduced perfusion or blood flow to the end organs such as the brain, kidneys, and vascular system in general. This acute heart failure causes an acute blood deficiency in the tissue and organs and thus an oxygen deficiency, also known as hypoxia, which may lead to end-organ damage. In most cases, such cardiogenic shock occurs as a result of complications in acute myocardial infarction (AMI) or a heart attack and is therefore one of the most common causes of death in myocardial infarction. In Germany alone, about 350,000 people are affected by a myocardial infarction every year, about ten percent of whom develop cardiogenic shock.

Furthermore, cardiogenic shocks may occur as a complication of surgical treatment such as a bypass or due to inadequate or impaired lung function as well as dysfunctions of the conduction system, structural heart disease, or inflammatory processes of the myocardium. Although factors such as early revascularization, the administration of inotropic drugs, and mechanical support may improve the patient's physiological condition, the mortality rate in the event of a cardiogenic shock remains above fifty percent.

To improve the patient's condition, circulatory or life support systems have been developed that provide mechanical support and may be rapidly connected to the circulation to improve blood flow and perfusion of the organs, including the heart's coronary arteries, and prevent a hypoxic state. For example, systems have been developed in which a balloon is invasively introduced into the aortic region and is controlled so that it is rapidly inflated, for example with helium, during the diastolic phase of the cardiac cycle to improve blood flow to the heart muscle tissue during this phase. Such systems are known under the term "intra-aortic balloon counterpulsation" (IABP). However, the effect of such systems is very limited, especially since only blood that has not been sufficiently oxygenated during a cardiogenic shock is transported into the coronary arteries. Therefore, this procedure does not offer a significant improvement over a drug setting with, for example, inotropic drugs or catecholamines.

Furthermore, extracorporeal circulatory support systems are known, which are based on the fact that blood is taken, e.g., from the right atrium or the vena cava through a cannula, which has been inserted into the femoral vein, and is returned to the patient via a membrane ventilator by means of a perfusion cannula inserted into the femoral artery, wherein the membrane ventilator decarbonize, i.e., removes carbon dioxide, and oxygenates the blood. Such systems are also known under the term "extracorporeal membrane oxygenation" (ECMO).

Although this improves the perfusion of organs, the perfusion is continuous during both the systolic and diastolic phase, such that this arrangement causes a retrograde blood flow directed against the actual ejection direction of the heart, thus increasing afterload. As a result, the heart is hindered in its ejection and empties to a lesser extent while at the same time the heart has to do more muscle work and therefore requires an increased oxygen supply. This is particularly disadvantageous for hearts already damaged by a myocardial infarction. Thus, such a system is primarily used in cases of cardiac arrest or intentional circumvention of the patient's own cardiac capacity, for example during surgical application or intervention. In order to reduce the afterload in a beating heart, the patient may also be prescribed medication by administering so-called vasopressors, which dilate or widen the vessels and thus reduce the resistance and afterload. In these cases, however, the existing cardiac output of the patient is not supported therapeutically, but rather the cardiac output is replaced by the system.

Furthermore, the blood flow of the coronary arteries of the heart, which normally provide the heart muscle with sufficient oxygen, generally occurs in the diastole of the cardiac cycle and therefore depends on a corresponding emptying of the left ventricle. If the filling pressure at the end of the systole, or at the beginning of the diastole, in the left ventricle is as low as possible, the coronary arteries may develop their lumen as much as possible in order to increase the blood flow rate and oxygen supply. The percutaneous femoro-femoral connection of the extracorporeal circulatory system and the resulting retrograde flow reduces the emptying of the left ventricle, so that the system is also disadvantageous for the perfusion of the coronary arteries. In addition, the flow of the blood pump may be adjusted in such a way that the blood flow closes the aortic valves. Because blood is furthermore pumped from the pulmonary vein via the right atrium into the left ventricle and may not escape, the pressure in the left ventricle increases further in this case, which may result in a further reduction in perfusion of the coronary arteries. In other words, assisted perfusion, which is beneficial for the end organs, has a detrimental effect on coronary perfusion.

Another problem with many mechanical support systems is that they do not provide a blood flow that corresponds to a normal physiological blood flow, i.e., a pulsatile blood flow. Although systems with pulsatile or non-occlusive blood pumps are known and may achieve an improved perfusion for the end organs, the negative effect on afterload and the corresponding reduction in perfusion of the coronary arteries has not been adequately addressed to date. Due to the high heart rate, which may also be variable, and the corresponding short duration of the respective phases, the possibilities for providing sufficient perfusion of the end organs and simultaneously improved perfusion of the coronary arteries are very limited. At best, a generally lower blood flow or also a shorter pulsatile perfusion is adjusted or set in order to take possible fluctuations into account, but this is a fixed setting and does not allow a perfusion that is optimized according to the physiological state.

Accordingly, there is a need to optimize the properties of a blood flow provided by a blood pump in such a way that it is adaptable to the physiological condition of the patient and provides both an optimization of the perfusion of the end organs and the coronary arteries.

SUMMARY

Based on this technological background, it is an aspect of the present invention to enable an improved perfusion of the coronary arteries during extracorporeal circulatory support.

In an aspect, a control unit for a non-occlusive blood pump of an extracorporeal circulatory support is configured to receive a flow value of the extracorporeal circulatory support, to receive a measurement of an arterial pressure and an ECG signal of a supported patient over a predetermined period of time, to determine a mean arterial pressure of the extracorporeal circulatory support or of the supported patient from the measurement of the arterial pressure and to determine an energy equivalent pressure from the flow value and the arterial pressure, and to determine a required value of at least one pulse parameter of the blood pump from the mean arterial pressure, the energy equivalent pressure, and the ECG signal to effect a ratio of the energy equivalent pressure to the mean arterial pressure which is greater than 1.0. The control unit is also configured to set the pulse parameter in dependence on the ECG signal.

The control unit may, for example, control one or more pump drives or pump heads for non-occlusive blood pumps present in an extracorporeal circulatory or life support system.

The blood pump may be arranged for oxygen enrichment and decarbonization of the blood, i.e., removal of carbon dioxide or its reduction. For example, the blood pump may be fluidly connected with an oxygenator or a membrane fan, which is provided in the extracorporeal circulatory support system, which is for example connected to a venous access by way of a venous cannula or to an arterial access by way of an arterial cannula for suction or for promoting circulation of the blood, in order to provide a blood flow from one side with a lower pressure to the other side with a higher pressure. In this way, an extracorporeal oxygen enrichment of the blood and an improved oxygen supply for the patient can be provided. These features may be further improved by a non-occlusive blood pump of pulsatile character and by the ratio of the energy equivalent pressure to the mean arterial pressure, in particular in view of the perfusion of the coronary arteries and the target organs. By setting of the predetermined ratio, the control unit is not dependent on defined or predetermined values of the pulse parameter. In particular, the pulse parameter may be adjusted and optimized directly to the physiological requirements of the respective patient.

For example, the non-occlusive blood pump may be magnetically coupled to the pump drive of a motor to allow torque transmission. A centrifugal pump such as a rotor pump or an impeller pump may be used as a non-occlusive blood pump, for example a centrifugal pump or a semi-axial pump, also known as a diagonal pump. While a centrifugal pump may produce a high pressure at a low flow rate, diagonal pumps may produce a high flow rate at a low pressure, which is in line with the general requirements for pulsatile blood pump systems and is particularly beneficial for extracorporeal circulatory support and respiratory support in cardiogenic shock. For example, by rapidly providing a high flow rate at a low pressure head, an improved and more accurate synchronization based on an ECG signal may be achieved.

In contrast to a roller pump or occlusive blood pump, a rotor pump may not build up pressure and release it at a given point in time. However, by changing the rotational speed of the rotor blade or impeller, a low pressure may be built up, which is forwarded as a flow and has the advantage that a precise pulsation is enabled without the need for additional components such as valves. Furthermore, due to the small dimensioning of the rotor blade/impeller, a low inertia and thus a very precise control and precise delivery of a pulse at any rotary speed may be achieved.

Because human organs and cells naturally detect and process dynamic flow and pressure changes, they also react differently to different flow profiles. In particular, in the vascular endothelium, which forms the innermost layer of the vessels, mechanotransduction and signal transmission take place in response to shear stress and pulse pressure, regulating functions such as apoptosis, angiogenesis, atherosclerosis, and systemic blood pressure. In this respect, the non-occlusive blood pump has the further advantage of providing a pulsatile blood flow which reduces the mechanical and/or thermal stress on blood cells and prevents the destruction of red blood cells and the activation of platelets.

In general, pulsatile blood flow furthermore results in improved microcirculation of vital organs, improved vascular compliance, a reduction in inotropic support, increased brain oxygen saturation, increased urine excretion, and a reduction in gastrointestinal bleeding rates, which generally results in patients spending shorter periods in hospital.

The blood pump may be connected to a venous access by means of a venous cannula and an arterial access by means of an arterial cannula for aspirating or delivering blood so as to provide blood flow from a low pressure side to a higher pressure side. The blood pump can be formed as a disposable or single-use item and is fluidly separated from the respective pump drive and may be easily coupled, for example via a magnetic coupling. The control unit actuates the motor of the pump drive and is configured to adjust the speed of the rotor blade of the blood pump in such a way that the blood pump produces a wave-like flow corresponding to a pulsatile blood flow.

Furthermore, the pulse amplitude may be defined by changing the rotary speed, which may be inputted at the control unit and is optionally added to a basic flow. For example, a basic flow may be predefined, wherein the respective pulses cause an increase in the total blood flow. This results in a mean flow which is calculated accordingly by the control unit. For example, the blood pump may be configured for a speed between about 50 RPM and about 10,000 RPM to provide a blood flow between about 0.1 l/min and about 8 l/min, wherein the pulsatile flow is obtained by the rotary speed change. A blood flow between about 0.5 l/min and about 5.0 l/min (e.g., between 1 l/min and 2.5 l/min) can prevent coagulation and increase afterload to achieve a desired flow that provides adequate organ oxygenation, i.e., a sufficient number of oxygen-saturated red blood cells.

Another advantage of pulsatile blood flow is that a pulse energy is generated which results from the change in pressure with respect to the flow gradient over time. Accordingly, by multiplication of the respective integrals the hemodynamic work is obtained, which is divided by the flow integral to give the energy equivalent pressure, also known as "energy equivalent pressure" (EEP). This ratio is mathematically represented in the following formula:

$$\text{EEP (mm Hg)} = \int_{t1}^{t2} fp\,dt / \int_{t1}^{t2} f\,dt$$

Wherein the blood flow (f) and the pressure (p) are taken into account over a time interval from t1 to t2.

The energy equivalent pressure is comparable to the patient's blood pressure and is based on the idea that hemodynamic energy is transferred from the aortic root to the periphery by the axial movement of the blood flow and the elastic movement of the aortic wall. Accordingly, the energy equivalent pressure may be further converted into an excess hemodynamic energy, also known as "surplus hemodynamic energy" (SHE), which can represent the energy for a single pulse and corresponds to the additional energy generated by the pulsatile flow with respect to the non-pulsatile flow or basic flow. Thus, both the energy equivalent pressure and the excess hemodynamic energy provide quantifiable measures for the support to the circulation and/or heart.

To achieve an improvement over a constant blood flow and increase the patient's blood pressure, the energy equivalent pressure should be higher than the mean arterial pressure (MAP). In other words, a ratio of the energy equivalent pressure to the mean arterial pressure that is at least 1.0 or greater than 1.0 (for example, >1.0 and <1.25) causes physiological blood flow to be provided. Thus, a pulse contribution is calculated which causes an increase of the mean arterial pressure. For example, the pulse contribution may be at least 5 mmHg and can lie in the range between about 10 mmHg and 20 mmHg The pulses provided by the control unit are thus to be understood as physiological or quasi-physiological pulses.

For example, due to the pulsatile blood flow or the pulsing of the blood pump, the energy equivalent pressure may even be higher compared with a constant blood flow at the same mean arterial pressure, such that an improved blood flow to the distal vessels is provided. The difference in energy equivalent pressure is hence an indicator of the higher mean pressure required for a non-pulsatile flow to produce the same blood flow.

Accordingly, the energy equivalent pressure may be determined by the control unit, wherein the flow value that is provided by the blood pump may be entered manually, for example via the rotary speed of the rotor blade, and only a measurement of the arterial pressure is required. The mean arterial pressure may also be determined from this measurement by averaging the values.

The arterial pressure can be fed into the control unit via an interface, which is communicatively connected with at least one pressure sensor. In an embodiment, the pressure measurement is performed upstream of the blood pump, downstream of the blood pump and/or downstream of an oxygenator or membrane ventilator provided in the extracorporeal circulatory system and connected to the blood pump. The pressure measurement of an arterial pressure of the supported or assisted patient can be performed invasively in the patient, for example at the tip of a cannula of an arterial cannula, for example in the aorta of the patient, or by another pressure measuring probe, which may be positioned in the aorta at any preferred location. Alternatively, the measurement may also be performed on the a. femoralis and/or a. iliaca or a. radialis. In addition, there is the possibility that the pressure measurement may be performed using non-invasive pressure sensors (without direct blood contact) or invasive pressure measurement with blood contact at the tube ends or arms of the patient kit.

The flow value as well as the arterial pressure may be detected in a non-invasive manner and may be received by the control unit, e.g., by detecting the flow value via the speed of the rotor blade and/or by the arterial pressure via the non-invasive "Schlauchschenkel" or in the circulatory system extracorporeally from the patient. The circulatory system may be configured in a compact way and its complexity may be reduced. That implies for the patient that the inserted cannulae may be dimensioned smaller and the surgical intervention may be carried out in a less invasive manner.

From the determined energy equivalent pressure and the determined mean arterial pressure, the control unit may determine the corresponding ratio and adjust the pulse parameter of the blood pump accordingly in order to achieve the desired ratio of more than 1.0. This may be done iteratively and preferably continuously so that the effect of changing the blood pump pulse parameter on the patient's physiological condition is taken into account and the relationship between energy equivalent pressure and mean arterial pressure is not dependent on fixed values of the pulse parameter and may hence be optimized.

In an embodiment, the ratio is greater than 1.1 in order to achieve further improved therapeutic support for the patient. For example, a determined ratio of 1.0 may require an increase in energy equivalent pressure, and/or a decrease in mean arterial pressure and a first change in a pulse parameter may cause a ratio of 1.05 and a second change in the value of the pulse parameter may cause a ratio of 1.15 so that no further change in the pulse parameter is required. The ratio may furthermore be 1.15 to 1.25, for example about 1.2, for example in case of cardiac arrest during resuscitation of the patient when the mean arterial pressure of the patient is in a lower limit range.

The value of the pulse parameter is furthermore adjusted based on an ECG signal or the heart rate. The ECG signal can be a characteristic ECG signal that allows the control unit to synchronize with the blood pump so that a signal corresponding to the value of the pulse parameter may be output regularly or periodically from the control unit to the pump drive or to the blood pump. For example, the ECG signal or the respective area in the electrical excitation system may be characteristic of the systolic or diastolic phase of the heart, so that the setting or adjusting of the pulse parameter and the actuation of the motor may take place at a predetermined time point and in a predetermined phase and does not cause any overlap with other phases.

By synchronizing the pulse with the ECG signal, a pulsatile blood flow is provided that corresponds to the patient's cardiac cycle. This allows the pulse rate of the blood pump to be adjusted to the heart rate and, if necessary, other physiological parameters of the patient so that, for example in the case of tachycardia, a pulse parameter may be changed so that the pulse does not overlap or interfere with a phase of the cardiac cycle in which the pulse is not intended. However, the required ratio between the energy equivalent pressure and the mean arterial pressure still ensures sufficient perfusion of the coronary arteries and end organs within the physiological limits and pumping characteristics.

Compared to known ECMO systems with a continuous blood flow, both a physiological blood flow and an adaptation to the patient's cardiac cycle may be achieved according to the invention and the afterload, i.e., remaining pressure in the aortic region before or during the systolic phase, may be kept as low as possible or is not increased.

Furthermore, due to the pulsatile flow versus constant or continuous flow, a higher mean arterial pressure and higher energy equivalent pressure as well as improved excess hemodynamic energy are provided. Therefore, a higher systemic blood pressure with less inotropic support is achieved. This not only improves perfusion of the coronary arteries and end organs, but may also provide improved oxygen supply, for example, when an oxygenator or membrane ventilator is provided in the extracorporeal circulatory support system. Compared to known IABP systems, which do not provide any or possibly insufficient extracorporeal circulatory support, this results in improved relief and recovery of the heart muscle tissue.

The at least one pulse parameter can include a pulse amplitude, a pump speed or rotary speed, a pump speed change per unit time, a pulse duration, a systolic pump duration, a diastolic pump duration, a drive wheel deceleration, a drive wheel acceleration, an averaged pump flow, a basic flow, and/or a peak flow.

For example, the pulse amplitude and the pump speed may be used to specify the maximum blood flow during the pulse and thus the mean flow. The pump speed can be optimized to a maximum value on the basis of the determined ratio between the energy equivalent pressure and the mean arterial pressure in order to obtain or to effect the required pulse amplitude. For example, a pulse amplitude may be provided by changing the pump speed, wherein the change in pump speed may have a value between 50 rpm and 10,000 rpm and can lie between 1000 rpm and 5000 rpm, e.g., between 3000 rpm and 4000 rpm. Thus, a pulsatile blood flow may be provided with a sufficient mean flow, for example between about 2 and 3 l/min. A pump speed change may also optionally be added to a basic flow, wherein the obtained maximum pump speed is defined by a basic speed, the pump speed change per time unit and the pulse duration.

The pulse may furthermore be defined by the pulse duration, wherein a pulse duration can lie between 20 ms and 400 ms. For example, the pulse duration may be about 200 ms to provide a sufficient pulse at a normal heart rate. The pulse comprises a systolic pump duration and a diastolic pump duration in which a drive wheel acceleration or a drive wheel deceleration takes place. These phases of the pulse duration may be symmetrical, so that the systolic phase covers about 50% of the pulse duration, for example, 100 ms.

However, the systolic phase may also be adapted to the pulse duration, for example, if the pulse duration is shortened due to an increased heart rate and the systolic phase is extended to provide a sufficient pulse even with a shortened pulse duration. In this case, the pulse duration is asymmetrical, with the systolic phase, for example, comprising about 60% or about 70% of the pulse duration. In order to prevent increased blood flow from being provided even after the pulse duration, the drive wheel deceleration may also be increased during the diastolic phase. Conversely, the drive wheel acceleration may also be increased during the systolic phase to provide a shorter systolic phase with sufficient speed adjustment. In this case, for example, the systolic phase may comprise about 30% or about 40% of the pulse duration.

Accordingly, the blood pump may also be controlled or regulated at a shorter time interval in such a way that sufficient perfusion is provided without an undesired overlap of the pulse with a specific phase of the cardiac cycle. This may hence reduce or even prevent an undesirable afterload.

In order to further improve the pulse duration and pulse energy, the speed achieved during the pulse may be passively decelerated (without active braking) or actively braked. In the case of active braking, for example, a four-quadrant control may be provided, wherein four transistors are arranged mirror-symmetrically and form an H-bridge with one p-channel and one n-channel. A corresponding activation of the transistors enables a reversal of the current direction through a brushless DC motor, so that the motor of the pump drive may be switched in two opposite directions and a speed reduction may accordingly be actively achieved by a reversal of the current direction.

Furthermore, the blood pump may also be controlled in such a way that a negative blood flow is achieved at the end of the pulse. This causes suction to take place, which may, for example, be synchronized in such a way that this occurs during the systolic phase in order to further reduce the afterload.

The heart ejection volume, which may be determined by means of an impedance measurement, may also be provided as a further guiding variable for the pulse. For example, the impedance may be determined using pressure sensors provided in the extracorporeal circulatory support system, such as integrated pressure sensors, or by measuring the impedance in the patient's thorax region using either transcutaneous sensors or a probe placed in the esophagus to measure the impedance.

The required value of the pulse parameter may also be determined from a predefined mean arterial pressure and/or a predefined energy equivalent pressure. Alternatively, or in addition, this may be determined from a measured cardiac ejection volume, stroke volume, and/or ejection fraction.

For example, predefined threshold values may be stored in the control unit which correspond to essential values of vital parameters or the physiological condition of the patient. In other words, physiological limits for energy equivalent pressure and mean arterial pressure may thus be provided, which may be absolute and/or patient-specific values. For example, the mean arterial pressure may be predefined by an administered dose of catecholamine and/or the body volume or weight of the supported patient. Furthermore, for example, a high heart rate of the supported patient may require a reduction in mean arterial pressure, so that the pulse parameter is limited to a corresponding maximum energy equivalent pressure. These values may still be actively defined by current measurements of vital parameters, for example via an interface with a communicatively connected ECG device.

In order to receive the flow value required for the energy equivalent pressure, the control unit may be further configured to determine the flow value from an inputted blood pump speed or automatically based on a received flow measurement.

For example, the pump flow value may correspond to a specific speed, such that the inputting of the speed via a user interface of the control unit will define the pump flow value. In some embodiments, the pump flow value is measured by a flow sensor, so that a currently measured flow velocity is received by the control unit to determine the energy equivalent pressure. Since the flow value may still be different for each patient for a predefined speed, the flow sensor may be arranged at a cannula tip of the arterial cannula, the venous cannula, and/or in the line between the blood pump and the respective tip, for example, thereby enabling an accurate measurement of the flow value.

The flow value can include a patient-specific mean flow, wherein the control unit may be further configured to adjust the mean flow based on a received flow measurement and the mean arterial pressure by setting or adjusting the pulse parameter.

As already described above, the medium flow may be provided, for example, by increasing the rotational speed and the corresponding pulse amplitude. However, since the physiological and also the pathophysiological state of each patient is different, a patient-specific mean flow may be required for each patient. In addition to the flow measurement, which may be provided as described above by a flow sensor arranged in the extracorporeal circulatory support system, the optimal mean flow for the patient may be determined on the basis of the mean arterial pressure and thus set by adjusting the pulse parameter, for example via the speed of the blood pump.

This enables automated adjustment of the blood pump and the extracorporeal circulatory support. In addition to the mean arterial pressure and flow measurement, other vital parameters may be considered in determining the optimal mean flow, such as heart rate, age, pathological condition, and other physiological values of the patient.

The flow, pressure and pulse characteristic parameters may also be controlled by specifying an EEP value. The current EEP value is shown on the console display and may be changed to a target EEP. The display may also be made as an EEP percentage value, which refers to the maximum possible EEP value for the individual patient. This maximum EEP value may be determined individually for each patient using a short empirical algorithm.

In order to enable optimal synchronization of the pulse with the respective phases of the cardiac cycle, the control unit can be configured to determine a heart rate from the ECG signal and to set or adjust the pulse parameter on the basis of the heart rate. For example, the pulse duration of the pulse may hence be adapted to the heart rate and the motor or rotor blade may be actuated at the moment when it does not collide with a phase of the cardiac cycle.

The heart rate may alternatively also be determined from a pressure measurement, a pressure curve, a pressure change, a heart ejection volume, an ejection fraction, and/or an impedance measurement. The pulse parameter or the setting of the pulse parameter may be adapted accordingly to the heart rate of the patient, for example, by changing the pulse duration and adjusting the speed change.

The pulse parameter may optionally also be adjusted based on a corresponding pulse frequency. For example, the pulse parameter may alternatively be set only for every second or third heartbeat, so that instead of a ratio of 1:1, the pulse may also be set in a ratio to the heart rate of 1:2 or 1:3 if the heart rate exceeds a cut-off frequency. The heart rate may be monitored or evaluated for a predetermined period of time, wherein, for example, a short-term increase in the heart rate does not cause a change in the pulse rate and/or an initially reduced pulse rate may be reset or increased after the heart rate has normalized.

In particular, the control unit may be configured to determine an amplitude change from the ECG signal and to adjust the pulse parameter at a predefined time after the amplitude change.

For example, the trigger signal may be determined as a P-wave, one or more characteristic features of the P-wave, a point or segment, or characteristic features of the QRS complex, and the pulse parameter may be adjusted at a predefined time after the P-wave, QRS complex, or R-wave. However, other amplitude changes may also be determined, e.g., over a predefined distance section of the ECG signal or from a distinctive point of the ECG signal. In some embodiments, an R-wave is determined from the ECG signal. The pulse parameter may be set at a predefined time after the detection of the R-wave, for example the detection of the maximum amplitude, typically with a delay. In addition, the amplitude change may be averaged over a predefined period of time so that any deviations or variations may be taken into account when setting or adjusting the pulse parameter.

The R-wave may, for example, be determined from a surface ECG of the patient, but it may also be invasive, for example, via a lead at the tip of a venous drainage cannula in the right atrium or the vena cava superior, at the tip of the arterial cannula in the aorta or the a. femoralis or the a. iliaca. Furthermore, the ECG signal may be derived via an invasive esophageal probe or via non-invasive pressure sensors on tube arms, for example integrated pressure sensors (IPS) integrated into the tubing system.

The R-wave of the QRS complex that is read out from the ECG signal may then be used as a trigger signal, wherein the pump signal or the setting of the pulse parameter takes place after a predefined delay. For example, the delay may be selected such that the pump signal occurs at the time when a short pressure increase takes place in the aorta, which marks the time of aortic valve closure and thus the beginning of the diastole (dicrotic point). By actuating the motor or the pump drive and thus the rotor blade and the triggering of the pulse at this time point, a pulsatile blood flow may be delivered via an arterial cannula into the area (directly) downstream of the left ventricle and into the aorta. The positioning and countercurrent orientation of the cannula tip thus increase the pulsatile blood flow in the coronary arteries and provide a correspondingly improved blood flow to the heart muscle tissue without impairing the systemic circulation.

However, the pressure increase caused by the pulse must be completed at the beginning of the systole to prevent overlapping. The pulse duration is hence accordingly limited, but this is unproblematic with a normofrequent heart rhythm. For example, there may be about 300 ms between the detected R-wave and the closing of the aortic valves and a waiting time between the detection of the R-wave and the output of the pump signal may be about 200 ms, for example between 150 ms and 250 ms, so that the actuation by output of the pump signal or pulse parameter may be 100 ms. Although the pump signal is given before the aortic valves are closed, the pump signal can be output in such a way that the pulse or pressure level is at a cannula tip when the aortic valves are closed, so that a latency time for the fluidic transport time may be taken into account with regard to the pump and lines used.

The pulse duration may be about 200 ms, for example 100 ms to 300 ms, wherein the systolic phase of the pulse is about 100 ms, when the pulse is symmetrically emitted. In order to achieve sufficient perfusion, a pulse amplitude may be selected by setting a speed change between 2500 rpm and 4500 rpm, e.g., about 3500 rpm.

However, at an increased heart rate, such as 90 to 130 beats per minute, these values may cause a flow collision between the pump outflow and the start of systole or heart ejection. To prevent this and to optimize the afterload, a pulse amplitude may be selected by setting a speed change between 1500 rpm and 5000 rpm and the pulse duration may range between 120 ms and 300 ms, for example. The pulse may be asymmetric, with the systolic phase ranging from about 70% to about 90%. Thus, even with a higher heart rate, a reduction in afterload and sufficient perfusion of the coronary arteries may be provided.

Accordingly, due to the pulsatile blood flow and the adjusting or setting of the pulse parameter based on the R-wave of the QRS signal an improved blood flow to both the heart muscles and the end organs may be provided, wherein the blood pump and pulse parameters may be completely adapted to the intrinsic heart rhythm of the patient through the appropriate configuration of the control unit. In particular, a diastolic augmentation may be achieved by pulse application without increasing the afterload too much and keeping it as low as possible.

In some embodiments, the blood pump is a diagonal pump, which has the advantage that the flow rate or the mean flow may be low at a higher pressure, at least in the diastole, and both the pressure and the flow rate may be increased in the diastolic phase. Thus, the remaining pressure after the pulse and before the systolic phase is as low as possible, e.g., even negative by a corresponding control. Furthermore, a diagonal pump has the advantage compared to a centrifugal pump that the impeller has a smaller circumference and a smaller mass to accelerate and may thus be accelerated and decelerated faster and the pulse may be finer adjusted because there is a lower mass inertia.

In addition to the received ECG signal, the control unit may also be configured to receive a measurement of the aortic pressure of the supported patient over a predefined period of time and set the pulse parameter at a predefined aortic pressure and aortic pressure change.

Thus, the aortic pressure may serve as verification of the predefined pulse delay and/or pulse duration, wherein the latency time for the fluid transport time may be taken into account. In this way, a user of extracorporeal circulatory support may manually set the exact time of the trigger signal and adjust it to the measured aortic pressure or cardiac output. However, the measured aortic pressure or ejection power may optionally also be used as feedback for the control unit, wherein the measured aortic pressure or cardiac capacity provides a feedback signal which is automatically taken into account when the pulse parameter is set. Thus, the setting or adjusting of the pulse parameter may be further improved and performed iteratively.

Alternatively, the measured aortic pressure may also replace the ECG signal, wherein the aortic pressure is evaluated by the control unit and wherein a change in aortic pressure in a pressure curve is characteristic for a specific cardiac phase of the cardiac cycle. For example, a short increase in aortic pressure after a decrease in aortic pressure (dicrotic point) may indicate the closing of the aortic valves and thus the onset of diastole or the filling phase of the heart. Such a pressure change may, for example, be detected in a pressure curve as a dicrotic point.

The control unit can be configured to determine a diastolic phase and systolic phase of the heart of the supported patient from the ECG signal and/or the aortic pressure and to at least adjust the pulse duration in such a way that it ends before the systolic phase.

While the R-wave of the ECG signal indicates the beginning of the systole or the ejection of the heart, a short increase in aortic pressure after a decrease in aortic pressure indicates the closing of the aortic valves, the beginning of the diastole or the filling of the heart, as described above. Accordingly, the accuracy of the output of the blood pump control signal may be further increased by combining the ECG signal and the measured aortic pressure, so that any ECG interference will not affect the safety of the patient and the functionality of the control unit.

The termination of the pulse before the systolic phase is, as described above, advantageous for the afterload reduction and still allows a diastolic augmentation with a sufficient perfusion of the end organs. Such a diastolic augmentation may be achieved, for example, by a retrograde blood flow with an appropriate cannula positioning, for example, with a positioning in the aortic region or in the a. femoralis. However, depending on the patient, central cannulation may also be required to provide an antegrade blood flow. In this case the pulse parameters may alternatively be adjusted with or during the systolic phase such that it is pulsed with the systolic phase.

The above aspect is further achieved by a system for extracorporeal circulatory support of a patient. Accordingly, the system comprises a venous patient access and an arterial patient access, a non-occlusive blood pump fluidly connected to the venous patient access and the arterial patient access and adapted to provide blood flow from the venous patient access to the arterial patient access, and an interface for receiving a measurement of an arterial pressure and an ECG signal from the patient. The system also includes a control unit as described in the above.

To fluidly connect the non-occlusive blood pump to the venous patient access and the arterial patient access, the system may include a suction line and a delivery line, respectively, each having an internal lumen with an inlet and outlet opening wherein blood may flow from the venous patient access to the arterial patient access via the blood pump when the blood pump is operated or actuated. The suction line may also be connected to a fluid reservoir, e.g., a blood reservoir, via a specific branch, such that additional fluids may be administered to the patient while the system is operating, such as blood for blood transfusion or to maintain a sufficient blood volume. The lines may be connected to the blood pump via simple connections such as Luer connections and, like the blood pump, can be formed as exchangeable disposable items. The blood pump may be coupled with a pump drive via a pump head, for example by means of a magnetic coupling. This means that the system may be used successively for several patients while at the same time complying with hygiene standards.

The suction line and delivery line may also each have a cannula, so the system includes a venous cannula and an arterial cannula configured to be inserted into the patient's heart or cardiac region, such as the right atrium or aortic region. This allows blood collection and delivery to be precisely matched to the anatomy of the heart and provides pulsatile blood flow directly in the coronary artery area. Thereby, the ejection in the systolic phase is not impaired while the perfusion of the coronary arteries in the diastolic phase is optimized.

The blood pump is can be a diagonal pump, as described above. This allows a low flow rate to be provided at a higher pressure or with higher pressure peaks, which is advantageous for accurate synchronization with the ECG signal, especially for synchronization with the diastolic phase. Furthermore, the impeller of such a diagonal pump has to accelerate a smaller circumference and a smaller mass, so that it may be accelerated and decelerated faster and the pulse may be adjusted finer. The pump capacity causes a blood flow to be provided from a low pressure side to a higher pressure side, wherein the control unit actuates the motor of the blood pump and is configured to adjust the rotational speed of the rotor blade such that the blood pump accordingly produces a wave-like flow corresponding to a pulsatile blood flow.

By providing a synchronized pulsatile blood flow, the system may be especially used for the treatment of an oxygen deficiency of the heart muscle tissue, for example from a cardiogenic shock, such that the perfusion of the coronary arteries is also improved in a pathophysiological state and with a reduced oxygen supply of the heart muscle, without impairing the perfusion of the end organs or at the same time also improving such perfusion. The system thus preferentially offers therapeutic support for the patient's own cardiac performance. Furthermore, the system may be used to support catheterization processes or in the event of a heart attack or cardiac arrest, or as an artificial replacement for and support of the cardiac function in the event of a varying or lost cardiac output.

One or more components of the system may still be integrated in one housing. For example, the control unit may be arranged in a console that has a user interface for inputting and reading out system settings, in particular for blood pump parameters. For example, the console may include a touch screen and/or a display with a keyboard that may be operated by a user. The control unit operates, actuates, controls, regulates and monitors the blood pump and enables synchronization of the blood pump with the heart cycle of the respective patient.

For example, the control unit may record the received ECG signal and heart rate, with the display showing the current ECG signal graphically and the current or averaged heart rate numerically. In addition, characteristic or distinctive properties of the ECG signal may be emphasized or marked in the graphical display, so that in a QRS signal, for example, a detected R-wave for outputting the pulse parameter or the pump signal may be marked in the ECG signal. Furthermore, further settings such as the time of the outputted pulse parameter and the pulse duration may be displayed in the ECG signal, such that a user may monitor the control and regulation of the blood pump with regard to the physiological condition of the patient.

The interface may, for example, be formed as a sensor box, which may be connected to various sensors such as pressure sensors integrated in the tubing system and an ECG device via connections.

In some embodiments, the system also includes an ECG device that is communicatively connected to the interface. This allows the system to be used independently of the presence of other components. The ECG unit may also be attached to the control unit to provide a compact system. The ECG device can be integrated in a single housing of the system, for example in the sensor box in the form of an ECG card or an ECG module. Alternatively, the control unit may be configured to receive an external ECG signal from the supported patient, for example from a heart monitor outside the system. This makes the system even more compact.

Furthermore, the extracorporeal circulatory support system may be configured as a portable system, such that a patient does not need to be treated at a fixed location and the patient's mobility is improved. The various components of the system such as the blood pump, the control unit and, optionally, the ECG device may be operated by an integrated battery. In some embodiments, the non-occlusive blood pump and/or the control unit, or both, are configured for extracorporeal arrangement. Also, the ECG device may be configured for extracorporeal application.

To enable more accurate blood collection and delivery of pulsatile blood flow, the system can include at least one cannula for introducing the arterial patient access into the patient and one cannula for introducing the venous patient access into the patient as described above. The cannulae may also be used to derive the required ECG signal, for example via a lead at the tip of the cannula or at a position of the venous cannula, a venous drainage cannula in the right atrium or the vena cava superior, at the tip of the cannula or at a position of the arterial cannula in the aorta or the a. femoralis or the a. iliaca. Thus, for example, an R-wave of a QRS signal may be accurately detected and interferences that may occur with a surface ECG are avoided as far as possible.

The cannula for inserting the arterial patient access can be adapted for insertion into the aortic region, for example into the aorta ascendens or descendens, or into the a. femoralis, and/or the cannula for inserting the venous patient access can be adapted for insertion into the right atrium or into the vena cava. Depending on the physiological condition of the patient, different cannula sizes and areas of the patient circulation may be selected.

Alternatively, the cannulas may also be designed as a common cannula or as a double lumen cannula, which may be inserted intercostal into the apex of the heart, for example. Such a cannula may be used, for example, if insertion into the aortic region is difficult or unfavorable to the patient. Depending on patient-specific circumstances, intravascular or intracardiac cannulas may hence be used in the system.

The system may also include an oxygenator or a membrane oxygenator which allows decarbonization, i.e., removal or reduction of carbon dioxide, and oxygenation of the blood taken from the patient and provides a much better oxygen supply to the heart muscle tissue compared to known IABP methods. For example, a membrane ventilator such as an iLA membrane ventilator may be provided in the system, which may also be operated without a pump and only by the cardiac performance, as this has a low resistance. In some embodiments, the system includes a relatively flat and angular oxygenator with superimposed mats compared to the housing. Alternatively, any gas exchanger may be used, e.g., also a round and/or cylindrical oxygenator, for example with wound mats. In some embodiments, the membrane oxygenator is configured to be arranged extracorporeally.

The above aspect is further achieved by a method for controlling a non-occlusive blood pump of an extracorporeal circulatory support. The method includes:
  Receiving a flow value of the extracorporeal circulatory support;
  Receiving a measurement of an arterial pressure and an ECG signal from a supported patient over a predefined period of time;
  Determining a mean arterial pressure of the extracorporeal circulatory support or supported patient based on the measured arterial pressure and an energy equivalent pressure based on the flow value and the arterial pressure;
  Determining a required value of at least one pulse parameter of the blood pump from the mean arterial pressure, the energy equivalent pressure and the ECG signal to effect a ratio of the energy equivalent pressure to the mean arterial pressure which is greater than 1.0; and
  Adjusting the pulse parameter in dependence on the ECG signal.

In some embodiments, an R-wave is determined from the ECG signal and the pulse parameter is set at a given time after the R-wave, as described above. This improves the perfusion of the coronary arteries in the diastolic phase and significantly reduces afterload.

The following pulse parameters may also be set: pulse amplitude, pump speed, pump speed change per time unit, pulse duration, systolic pump duration, diastolic pump duration, drive wheel deceleration, drive wheel acceleration, and/or averaged pump flow.

Furthermore, a diastolic phase and systolic phase of the heart of the supported patient may be determined from the ECG signal and at least the pulse duration may be adjusted so that it ends before the systolic phase. Thus, the pulse and the energy equivalent pressure provided are adapted to the heart rate of the patient and the possible perfusion of the coronary arteries is optimized accordingly.

It may also be provided that a value is received via the ejection capacity, which is either calculated or determined, for example, by an impedance measurement or the pressure measurement.

As described above, depending on the patient, central cannulation may also be required to provide antegrade blood flow. In this case, the pulse parameters may alternatively be set with the systolic phase such that it is pulsed with the systolic phase.

The required value of the pulse parameter may also be determined as a function of a predefined target value or a predefined target percentage of the energy equivalent pressure.

Thus, the flow, pressure and/or pulse characteristic parameter may also be controlled by predefining a value of the energy equivalent pressure. For example, the current energy equivalent pressure value may be shown on a console display and then optionally be changed to a target value. It may also be displayed as a percentage of the energy equivalent pressure, which refers to the maximum possible value of the energy equivalent pressure for the individual patient. This maximum value may, for example, be determined on a patient-specific basis using a short empirical algorithm.

The method described herein can be carried out by a control unit as described herein. In some embodiments, the controlled non-occlusive blood pump is fluidly connected to a typically extracorporeally arranged membrane oxygenator when applying the method described herein. Hereby, oxygen enriched and/or carbon dioxide reduced blood (of the patient) may be guided—upon its passage through the membrane oxygenator—to the patient. The components, by which the method is carried out, are typically arranged extracorporeally. Hereby, a portion or all of the method described herein may be carried out non-invasively, i.e., extracorporeally.

Furthermore, the ratio of the energy equivalent pressure to the mean arterial pressure may also be displayed on a display or monitor. The energy equivalent pressure can be displayed in mmHg and/or as a percentage of the maximum achievable value of the energy equivalent pressure.

BRIEF DESCRIPTION OF THE DRAWINGS

Embodiments of the invention are explained in more detail in the following description of the figures, in which.

DETAILED DESCRIPTION

In the following, preferred embodiments will be explained in more detail with reference to the accompanying figures. In the Figures, corresponding, similar, or like elements are denoted by identical reference numerals and repeated description thereof may be omitted in order to avoid redundancies.

Figure 1:
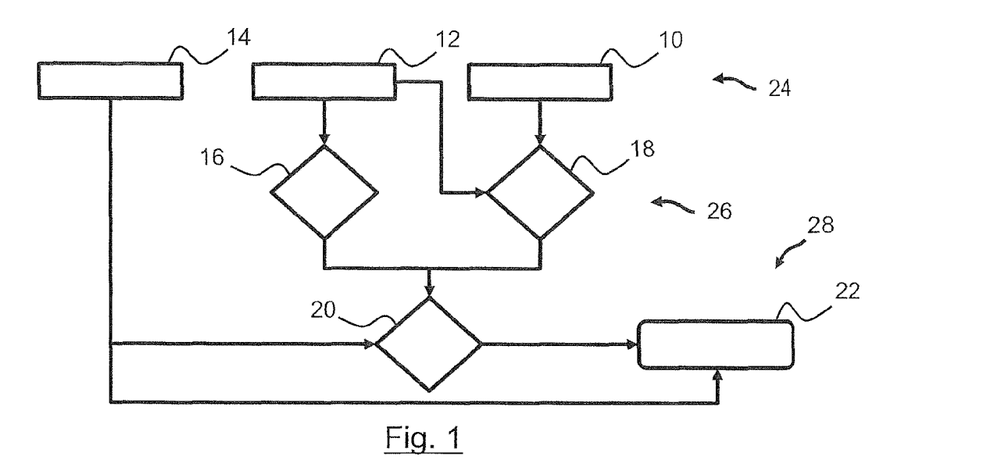
FIG. 1 is a schematic representation of a control logic of a control unit.

FIG. 1 schematically shows a control logic for a control unit, wherein values from an interface 24 are accordingly inputted into a control and regulation unit level 26 and, after processing by the control logic, cause a setting or adjustment on a blood pump level 28.

Accordingly, the control unit is configured to receive a flow value 10 of the extracorporeal circulatory support as well as a measurement of an arterial pressure 12 and an ECG signal 14 of a supported patient over a predefined period of time via interface 24. Based on the measurement of the arterial pressure 12, a mean arterial pressure 16 is determined. The mean arterial pressure 16 may be determined both from an arterial pressure measurement 12 from the extracorporeal circulatory support as well as from the patient, e.g., via a tube arm of an arterial access or via an invasive pressure sensor. According to the present embodiment, the mean arterial pressure 16 of the supported patient is determined, for example, either via the a. radialis or directly in the aorta.

Furthermore, a flow value of 10 may be obtained via a corresponding tubing arm of the arterial access and provide direct feedback regarding the blood flow in the extracorporeal circulatory support for the control unit. For example, the blood flow provided by a non-occlusive blood pump may be inputted as a rotational speed and may be adapted to the feedback value. In other words, a flow value of 10 may first be set via a corresponding speed and corrected continuously or periodically on the basis of a current measurement. In this way, any different patient parameters or also tube parameters that may cause a change in the flow value 10 at the same blood pump speed may be taken into account.

The control unit also determines an energy equivalent pressure 18 on the basis of the received flow value 10 and the arterial pressure 16. In order to achieve a pulse contribution to the mean arterial pressure, a current ratio of the energy equivalent pressure 18 to the mean arterial pressure 16 is determined in the control unit. For example, this ratio may initially be about 1.0, so that no pulse contribution or only a limited pulse contribution is achieved by the extracorporeal circulatory support. In order to increase the ratio and thus the pulse contribution, a required value of at least one pulse parameter 20 of the blood pump is determined in the control unit. Not only is the ratio between the energy equivalent pressure 18 and the mean arterial pressure 16 determined iteratively, but the received ECG signal 14 is also taken into account.

For example, a possible pulse duration may be determined from the ECG signal, which prevents an overlap of two cardiac phases of the cardiac cycle during the setting of pulse parameter 20. This allows the pulse to be optimized over the determined possible pulse duration in order to achieve the desired or required pulse contribution and thus to increase the ratio between the energy equivalent pressure 18 and the mean arterial pressure 16, for example to 1.1 or higher. As a further pulse parameter, for example, a speed change per time unit may be selected, which increases the pulse amplitude during the determined and thus predefined pulse duration in such a way that a pulse with a predefined volume or flow per time unit is outputted, which achieves a corresponding contribution to the mean arterial pressure.

The pulse parameters 20 are adjusted accordingly to the determined value 22 and continue to be set on the basis of the ECG signal 14, so that an exact temporal specification of the output pulse is made. This allows, for example, that diastolic augmentation may take place without increasing the afterload or increasing it as little as possible, especially since the pulse is output in such a way that it ends before the systolic phase of the cardiac cycle and the remaining pressure is therefore very low.

Figure 2:
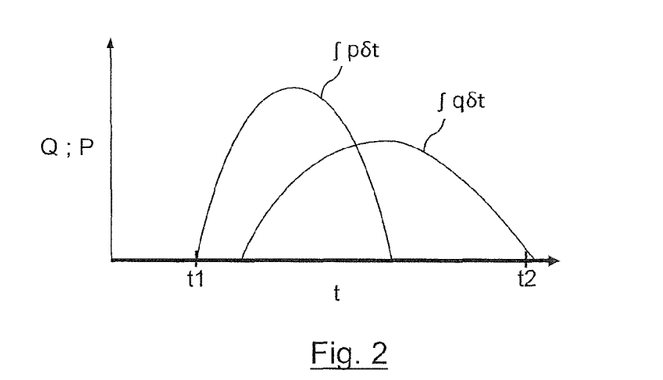
FIG. 2 is a schematic representation of the arterial pressure curve and the corresponding flow curve over a predefined period of time.

FIG. 2 shows an example of an arterial pressure curve (P) and the corresponding flow curve (Q) over a predefined time period (t). For a time interval t1 to t2 (t2>t1, i.e., t1 lies in the past compared to t2), both an integral of the change in pressure, for example in mmHg, and an integral of the change in flow, for example in l/min, may be calculated, which serve as a basis for calculating the energy equivalent pressure, for example according to the following formula:

$$EEP \text{ (mm Hg)} = \int_{t1}^{t2} fp\, dt / \int_{t1}^{t2} f\, dt$$

Wherein the blood flow (f) and the pressure (p) are taken into account over a time interval from t1 to t2.

FIG. 2 also shows that the increase in pressure and flow may have a temporal delay. In other words, the flow change may occur with a delay after the pressure change and may hence cause a latency period in the extracorporeal circulatory support.

In order to provide a pulsatile blood flow, it is provided that at least one pulse parameter is set as a function of an ECG signal. This allows regular pulsing and that the respective pulse may be adapted to the physiological condition of the patient. An example of such pulse parameters is shown schematically in FIG. 3.

Figure 3:
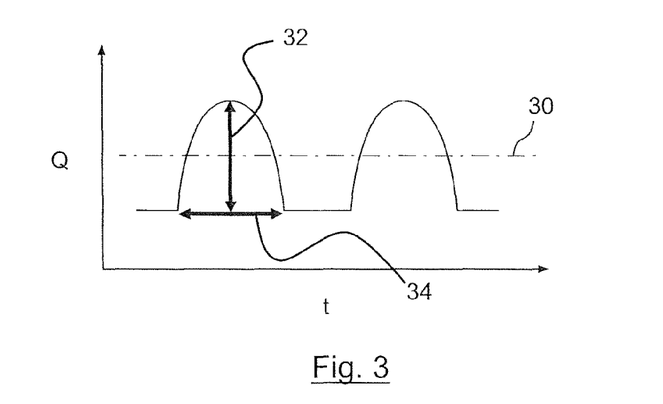
FIG. 3 is a schematic representation of a pulse output.

Accordingly, two pulses are shown at regular intervals over time (t), with the pulses being added to an optional basic flow. The basic flow may be achieved by adjusting the speed such that a blood flow between, for example, about 2 l/min and 3 l/min is provided.

In this example, the respective pulse is achieved by a speed change, which is caused by actuating the motor and the pump drive in the blood pump. This results in a pulse amplitude 32, which causes a corresponding change in the pressure (P) and thus in the flow (Q). The pulse is output for a predefined pulse duration 34, which corresponds to the determined possible pulse duration, such that the pulse duration 34 and the speed change per time unit result in a maximum blood flow or a maximum pulse amplitude 32. Once the pulse amplitude 32 has been achieved, the pump drive is no longer actuated, such that the speed of the blood pump is reduced to the basic flow after the predefined or set pulse duration 34. From the pulses and the basic flow, a mean flow 30 is obtained, which is represented by the dotted line. The mean flow 30 is thus greater than the basic flow and provides an additional contribution to cardiac output that increases the patient's mean arterial pressure and allows adequate perfusion or oxygenation of the end organs.

Figure 4:
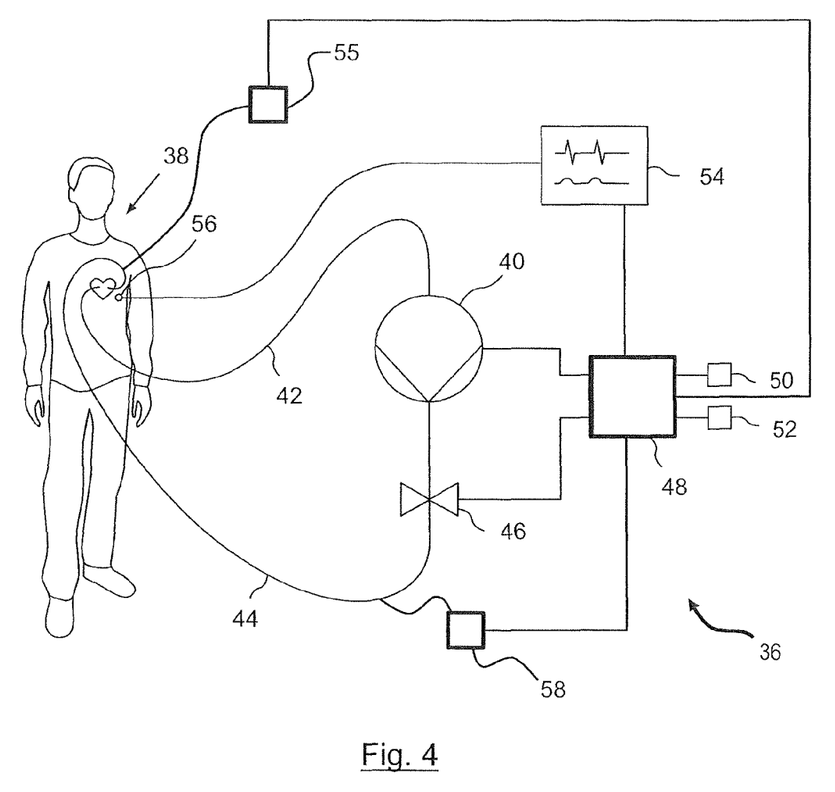
FIG. 4 is a schematic representation of a system for extracorporeal circulatory.

A system for extracorporeal circulatory support 36 is shown schematically in FIG. 4. The system 36 is connected to the patient 38 and allows an extracorporeal blood flow using a non-occlusive blood pump 40. Similarly, blood pump 40 is connected to patient 38 circuit via venous patient access 42 and arterial patient access 44, such that blood is drawn from patient 38 via a suction line and returned to patient 38 via a higher pressure delivery line. The patient accesses 42, 44 are optionally formed as cannulas and are inserted in such a way that a venous blood collection site (cannula tip and cannula shaft) is located in the region of the right atrium, e.g., in the v. cava superior and/or v. cava inferior, and the arterial return occurs via a femoral patient access 44, which is located either in the a. femoralis or in the aortic region, in order to provide a retrograde blood flow.

Furthermore, an optional flow restrictor 46 may be provided downstream of the blood pump 40. Although not shown in FIG. 4, the system 36 may also include an oxygenator for oxygenation and/or $CO_2$ reduction of the venous blood, which may, for example, be arranged downstream of the blood pump 40 in the flow direction.

The blood pump 40 is operated or regulated by a control unit 48. The control unit 48 may be formed as a console which includes a user interface 50 and a monitor 52 via which settings may be performed or information may be output. Thus, the parameters of the system 36 may be changed and/or monitored by a user.

The control unit 48 is furthermore coupled with an ECG device such that an ECG signal 54 may be received. The ECG device may, for example, be installed in an interface, such as a sensor box of the system 36, as an ECG card or ECG module, but may alternatively also be coupled to the system 36 via an interface as an external device. The ECG signal 54 is provided by sensors 56 attached to the patient 38, e.g. as a 4-pole surface ECG and may be displayed in single-channel or multi-channel representation with derivative selection, e.g., a Goldberger derivative and/or limb derivative.

Although the sensors 56, which are shown here only schematically, may also include a pressure sensor, which may be arranged at another anatomical region of the patient, a pressure sensor is provided in the present embodiment, which measures an arterial pressure of the patient 38. The pressure sensor may, for example, be coupled to an arterial cannula or inserted into the a. radialis as an independent cannula. The pressure sensor thus outputs a pressure measurement 55, which is received by the control unit 48.

However, as described in the above, the pressure measurement may also be calculated, for example, or may be performed via a tube line or a tube leg of an arterial cannula or delivery line, in order to detect a corresponding pressure value of the extracorporeal circulatory support. Optionally, more than one pressure sensor may be provided in the tubing set, wherein, e.g., one pressure sensor is arranged upstream of the blood pump 40, one pressure sensor is arranged downstream of the blood pump 40 and, if applicable, another pressure sensor is arranged downstream of an optionally provided oxygenator.

The control unit 48 is configured to determine a mean arterial pressure of the patient 38 based on the received pressure measurement 55, e.g., continuously and in real time. The mean arterial pressure may be used as a reference value for the blood flow provided by the blood pump 40 in order to achieve sufficient perfusion of the end organs. However, excessive blood flow may cause retrograde blood flow to close the aortic valve, increasing the afterload for the systolic phase or preventing the left ventricle from ejecting, if it is delivered at the wrong time of the cardiac cycle. This increases the pressure in the left ventricle, which results in a restriction of the coronary blood flow due to the increasing the wall tension of the left ventricle. At the same time, there is a backlog over the V. pulmonalis towards the lungs, which may lead to pulmonary edema and pulmonary hypofunction.

To further adapt the blood flow according to the patient 38, the control unit 48 is configured to receive a flow value of extracorporeal circulatory support from a flow sensor 58, wherein the flow sensor 58 is mounted on a tubing arm of the arterial patient access 44. The flow sensor 58 thus provides feedback for the set speed at the blood pump 40. Furthermore, the flow value allows the control unit 48 to determine the energy equivalent pressure in addition to the mean arterial pressure, as described above. This allows the control unit 48 to determine the ratio between the current energy equivalent pressure and the current mean arterial pressure and to iteratively determine the value of a pulse parameter required to increase the ratio above 1.0.

A heart rate determined from the ECG signal 54 and a possible resulting pulse duration are also taken into account, such that an overlap of the pulse with an inherent systolic phase may be avoided. The control unit 48 adjusts the hence determined at least one pulse parameter also depending on the ECG signal 54, for example on the basis of the R-waves determined from the ECG signal 54.

Figure 5:
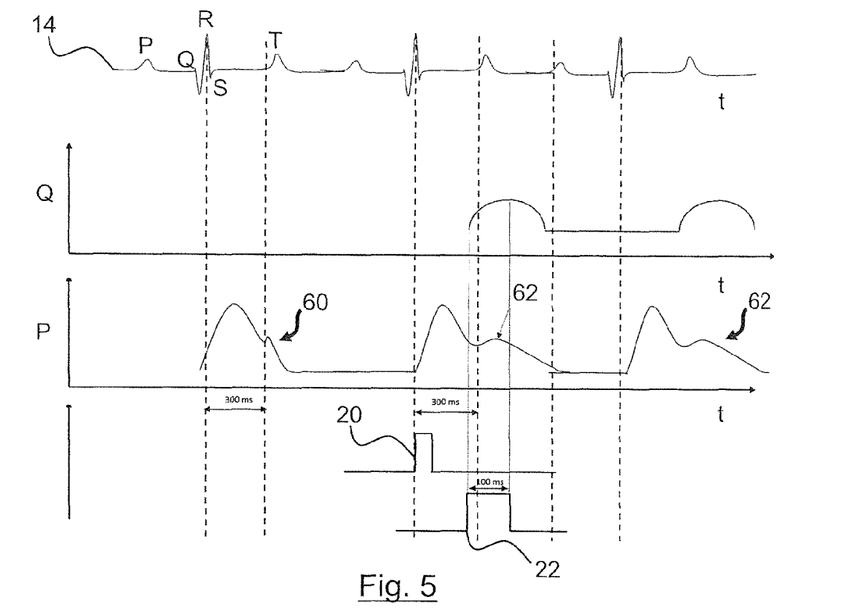
FIG. 5 is a schematic representation of a pulse adjustment based on a received ECG signal at a normofrequent heart rate.

Such a pulse setting is shown schematically in FIG. 5 at a normofrequent heart rate of the supported patient. An ECG signal 14 comprising a QRS complex is continuously received from the patient over time (t). Although basically every amplitude change in the ECG signal may serve as a trigger signal for the blood pump, in the present embodiment the R-wave is used, which marks the cardiac ejection or the systolic phase of the cardiac cycle. This is also shown in the third row or line, which depicts the arterial pressure course in the patient over time (t). Accordingly, a change of the arterial pressure occurs immediately after the R-wave due to the ejection of the heart, which is marked by the first two dashed lines and may amount to 300 ms, for example. After an initial increase in pressure, the pressure decreases again until the aortic valves close, which causes a slight increase in pressure and is marked by the dicrotic point (closing of aortic valve). At this point the diastolic phase or the filling phase of the heart begins.

As shown in FIG. 5, the pressure decreases further in the case of a non-augmented pressure, which is indicated by the arrow with the reference sign 60. In other words, no support or diastolic augmentation takes place for this heartbeat, i.e., no pulsing occurs by the extracorporeal circulatory support, as shown by the absence of a pulse in the course of the flow (Q) of the extracorporeal circulatory support in the second line or row. The filling of the heart is therefore not supported, such that the arterial pressure in the patient decreases rapidly.

After the heart rate and also the respective delay between the R-wave and the closing of the aortic valves have been determined or detected, the control unit outputs a signal to the pump drive or the motor of the blood pump in order to set a pulse parameter of the blood pump accordingly. The R-wave is used as trigger signal and to determine the pulse parameter 20 and the respective pulse parameter 20 is set or adjusted after a corresponding delay 22, as schematically shown in the fourth line or row. Accordingly, pulses are provided in the extracorporeal circulatory support, which are timely synchronized in such a way that they cause a corresponding pulsatile blood flow during the diastolic phase, as shown in the second line. This causes an increase in pressure during the diastole, which is included in the calculation of the mean arterial pressure with a factor of 2 against the factor of 1 of the pressure in the diastole and thus makes a 2-fold higher contribution to the increase in the mean arterial pressure. The augmented pressure 62 thus achieved ideally starts after the dicrotic point and thus causes diastolic augmentation without overlapping with the systolic phase.

Figure 6:
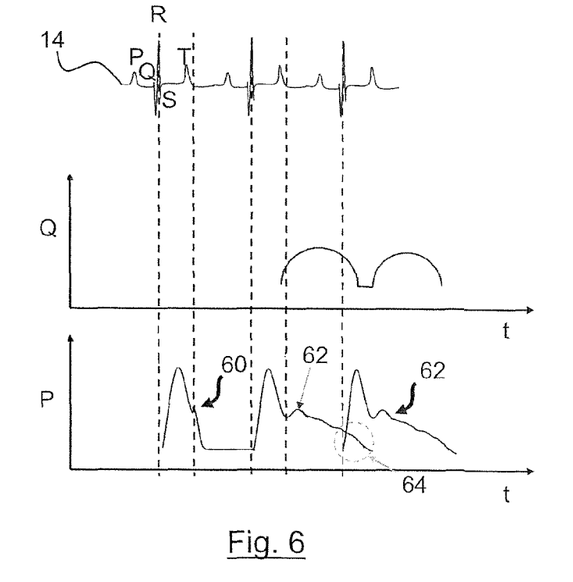
FIG. 6 is a schematic representation of an overlap of a patient pulse and the support pulse at an increased heart rate.

However, with an increased heart rate, the support pulse may overlap with the systolic phase of the patient pulse or the decay phase of the augmentation may interfere with the increasing phase of the left ventricular ejection, the systole, as schematically shown in FIG. 6. With an increased heart rate, the distance between the respective R-waves and thus also between the dicrotic point and the following R-wave is shortened, such that the diastolic phase is also shortened.

With a constant pulse duration, the augmented pressure 62 provided by the respective pulse may overlap or interfere with the subsequent systolic phase, which is represented by pulse superposition 64. This leads to an increase in afterload and requires either an adjustment of the support frequency or an adjustment of the respective pulse parameters, taking into account the maintenance of a sufficient or physiological EEP.

Figure 7A:
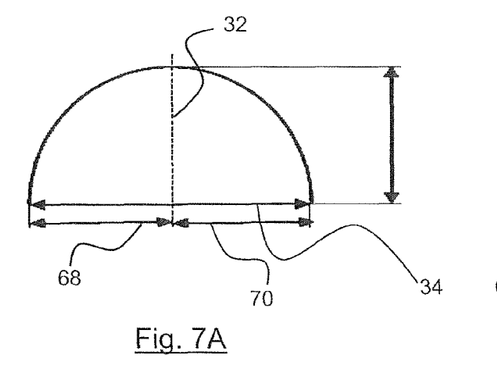
FIGS. 7A and 7B show examples of corresponding pulse parameter settings and according to FIG. 5 and FIG. 6, respectively.
Figure 7B:
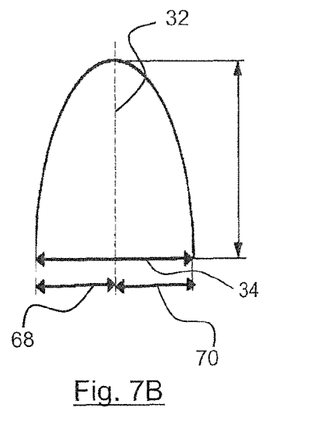

Although an adjustment of the pulse rate may be necessary, for example in tachycardia, the pulse parameters at an increased heart rate are preferably adapted to the physiological condition of the patient, as shown schematically in FIGS. 7A and 7B.

Thus, at a normofrequent heart rate, as shown in FIG. 7A, the pulse may be distributed over a longer diastolic phase, such that a corresponding longer pulse duration 34 of about 200 ms, for example, may be set. At the same time, the speed change per time unit may lie within a corresponding range, for example between 2500 rpm and 4500 rpm, such that the pulse amplitude 32 also lies within this corresponding range. The pulse duration 34 may also be symmetrically divided into an equal systolic pulse phase 66 and a diastolic pulse phase 68 of about 100 ms each, so that a uniform pulse is output.

However, if the heart rate is elevated, the pulse parameters may be modified as shown in FIG. 7B. The pulse duration 34 may thus be shortened to about 120 ms, for example. In order to nevertheless make a sufficient contribution to the mean arterial pressure, provided that the EEP is in the physiological range, a speed change between 3000 rpm and 5000 rpm may also be selected in order to increase the pulse amplitude 32 and the blood flow during the pulse accordingly.

This prevents a flow collision between the pump outlet and the beginning of the systole or the cardiac ejection even at a heart rate between 90 and 130 beats per minute, for example, and optimizes the afterload accordingly. Furthermore, the pulse may be asymmetrically divided, wherein the systolic phase may comprise about 50% to about 90% (not shown).

Further adaptation to higher heart rates to maintain a corresponding mean flow may be achieved by varying the support ratio to 1:2 and 1:3 depending on the heart rate.

Adapting the pulse parameters to the physiological condition of the patient thus has the advantage that even at a higher heart rate the afterload is not increased, and an adequate mean arterial pressure and adequate perfusion of the coronary arteries may be achieved. The pulse parameters are also selected to achieve a pulse contribution to the mean arterial pressure and an EEP of physiological pulse quality, such that due to the pulsatile blood flow an improved perfusion and end organ protection is achieved.

Figure 8:
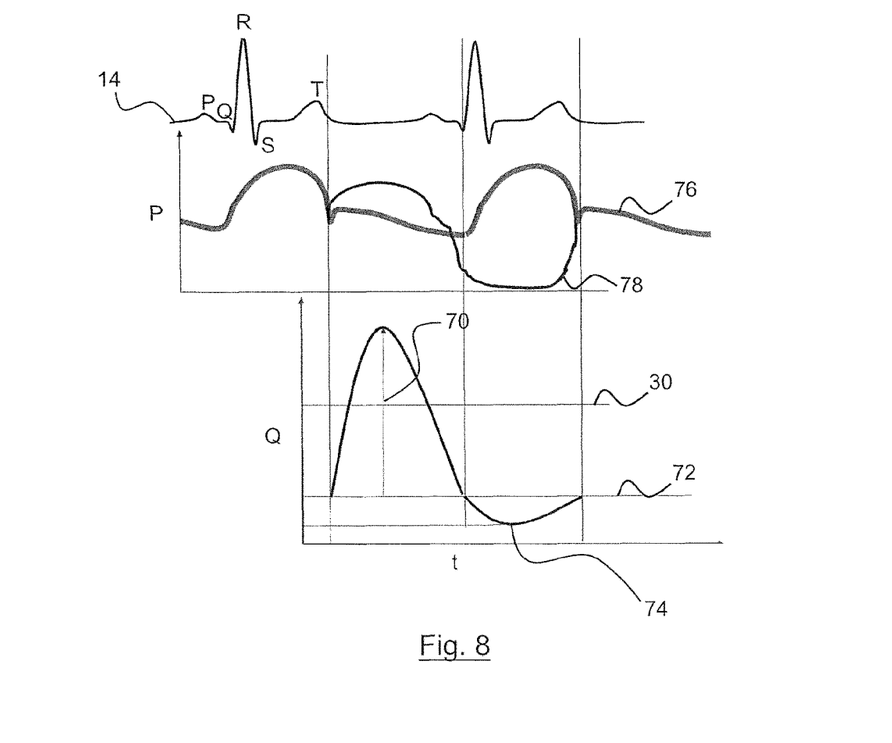
FIG. 8 is a schematic representation of a pulse setting for improved reduction of the afterload.

A further improvement of the afterload reduction may also be achieved by a corresponding pulse setting, as schematically shown in FIG. 8. The trigger signal and the control signals are not shown in this depiction for improved display. However, the control unit may set the pulse parameter similar to the embodiment depicted in FIG. 5, such that the R-wave from the QRS complex of the ECG signal 14 according to FIG. 8 also serves as the trigger signal and the pulse is output at the dicrotic point, such that a diastolic augmentation is achieved.

The arterial pressure (P), which is measured, for example, on an arterial arm of a tubing set, is shown schematically in the second line or row of FIG. 8, both without augmentation 76 and with augmentation 78, wherein in the third line a flow curve or the change in flow (Q) in the extracorporeal circulatory support during augmentation 78 is schematically shown. Accordingly, without augmentation 76, the arterial pressure decreases rapidly, similar to the non-augmented pressure 60 in FIG. 5. When the pulse is output, the pressure increases and the pressure decreases more slowly with augmentation 78, similar to the augmented pressure 62 in FIG. 5. The pressure drop may, however, also look different, such that the shape of the pressure curves is to be understood only as a schematic example and may look different in each patient, for example depending on patient-related factors such as vascular elasticity, degree of calcification, cardiac strength, viscosity, etc.

The corresponding flow (Q) in the extracorporeal circulatory support is added to a basic flow 72 and results in a maximum flow value due to the pulse, which is predefined by the change in speed per unit of time and the pulse duration and thereby causes a diastolic augmentation 70 compared to the basic flow 72.

To reduce the afterload, the speed after the diastolic pump phase (systolic cardiac phase) is set further below the corresponding value of the basic flow 72, such that a minimum flow of 74 is obtained below the basic flow 72 and the pressure in the systolic phase of the heart is reduced accordingly, as also results from the pressure reduction during the systolic phase in the augmentation curve 78. This continues to provide pulsatile blood flow at a required mean flow of 30 and a basic flow of 72, while further reducing afterload. This may occur, as shown in the diagram, in relation to the next heart ejection, but also in relation to the next but one at 1:2 support ratio.

Although this is not shown in FIG. 8, the speed may alternatively be changed in such a way that a negative blood flow is provided. For example, such a negative blood flow may be provided by a four-quadrant control, as described above. Such a four-quadrant control does not only allow a reduction (braking) of the speed or the impeller, but also a reversal of the direction of rotation by a reversal of the current direction, such that the impeller may rotate in an opposite direction. Such a negative blood flow at the end of the pulse and during the systolic phase thus causes a suction effect, which further facilitates the ejection of the heart and thus further reduces the afterload for the stressed and supported heart.

Where applicable, all the individual features depicted in the exemplary embodiments may be combined and/or exchanged without leaving the scope of the invention.

LIST OF REFERENCE NUMERALS

10 Flow value
12 Arterial pressure measurement
14 ECG signal
16 Determining the mean arterial pressure
18 Determining the energy equivalent pressure
20 Determining blood pump pulse parameter
22 Adjusting of the pulse parameter
24 Interface
26 Control unit level
28 Blood pump level
30 Mean flow
32 Pulse amplitude
34 Pulse duration
36 Extracorporeal support system
38 Patient
40 Blood pump
42 Venous patient access
44 Arterial patient access
46 Optional flow restrictor
48 Control unit
50 User interface
52 Monitor
54 ECG signal
56 Sensors
58 Flow sensor
60 Non-augmented pressure
62 Augmented pressure
64 Pulse overlap
66 Systolic pulse phase or pump duration
68 Diastolic pulse phase or pump duration
70 Diastolic augmentation
72 Basic flow
74 Minimal flow
76 Pressure without augmentation
78 Pressure with augmentation

The invention claimed is:

1. A control unit for a non-occlusive blood pump of an extracorporeal circulatory support, the control unit configured to
receive, during an extracorporeal treatment, a flow value of the extracorporeal circulatory support;
receive, during the extracorporeal treatment, a measurement of an arterial pressure and an ECG signal of a supported patient over a predetermined period of time;
determine, iteratively during the extracorporeal treatment, a mean arterial pressure of the extracorporeal circulatory support or of the supported patient from the measurement of the arterial pressure and an energy equivalent pressure from the flow value and the arterial pressure;
determine, iteratively during the extracorporeal treatment, a required value of at least one pulse parameter of the blood pump from the mean arterial pressure, the energy equivalent pressure, and the ECG signal to effect a ratio of the energy equivalent pressure to the mean arterial pressure of greater than 1.0; and
adjust, during the extracorporeal treatment, the pulse parameter in dependence on the ECG signal.

2. The control unit according to claim 1, wherein the at least one pulse parameter is selected from a pulse amplitude, a pump speed, a pulse duration, a systolic pump duration, a diastolic pump duration, a drive wheel deceleration, a drive wheel acceleration, and/or an averaged pump flow.

3. The control unit according to claim 1, wherein the mean arterial pressure is a given or predetermined mean arterial pressure, and the energy equivalent pressure is a given or predetermined energy equivalent pressure.

4. The control unit according to claim 1, wherein the control unit is configured to determine the flow value based on an inputted speed of the blood pump or automatically based on a received flow measurement.

5. The control unit according claim 1, wherein the flow value comprises a patient-specific mean flow, and the control unit is configured to adjust the patient-specific mean flow based on a received flow measurement and the mean arterial pressure by adjusting the pulse parameter.

6. The control unit according to claim 1, wherein the control unit is configured to determine a heart rate from the ECG signal and to adjust the pulse parameter in dependence of the heart rate.

7. The control unit according to claim 1, wherein the control unit is configured to determine an amplitude change from the ECG signal and to adjust the pulse parameter at a predetermined time point after the amplitude change.

8. The control unit according to claim 7, wherein the control unit is configured to determine an R-wave from the ECG signal and to adjust the pulse parameter at a predetermined time point after the R-wave.

9. The control unit according to claim 1, wherein the control unit is configured to receive a measurement of an aortic pressure of the supported patient over a predetermined period of time and to adjust the pulse parameter at a predetermined aortic pressure and change of aortic pressure.

10. The control unit according to claim 9, wherein the control unit is configured to determine a diastolic phase and a systolic phase of the heart of the supported patient from the ECG signal and/or the aortic pressure and to adjust at least the pulse duration such that the pulse duration ends before the systolic phase.

11. The control unit according to claim 1, further configured to determine a heart rate based on the received ECG signal and adjust the pulse parameter in dependence on the determined heart rate.

12. The control unit according to claim 1, wherein the control unit is configured to adjust the pulse parameter such that the pulse ends before a systolic phase of a cardiac cycle determined from the ECG signal.

13. The control unit according to claim 1, wherein a pulse duration is formed of asymmetrical pulse phases.

14. The control unit according to claim 1, wherein the ratio of the energy equivalent pressure to the mean arterial pressure is greater than 1.1.

15. The control unit according to claim 1, wherein the required value of the pulse parameter is determined from a predefined mean arterial pressure and/or a predefined energy equivalent pressure.

16. The control unit according to claim 1, wherein the control unit is configured to continuously determine the mean arterial pressure.

17. A system for extracorporeal circulatory support of a patient, the system comprising:
    a venous patient access,
    an arterial patient access,
    a non-occlusive blood pump fluidly connected to the venous patient access and the arterial patient access and configured to provide blood flow from the venous patient access to the arterial patient access,
    an interface for receiving a measurement of an arterial pressure and an ECG signal of the patient, and
    a control unit configured to:
        receive, during an extracorporeal treatment, a flow value of the extracorporeal circulatory support;
        receive, during the extracorporeal treatment, a measurement of an arterial pressure and an ECG signal of a supported patient over a predetermined period of time;
        determine, iteratively during the extracorporeal treatment, a mean arterial pressure of the extracorporeal circulatory support or of the supported patient from the measurement of the arterial pressure and an energy equivalent pressure from the flow value and the arterial pressure;
        determine, iteratively during the extracorporeal treatment, a required value of at least one pulse parameter of the blood pump from the mean arterial pressure, the energy equivalent pressure, and the ECG signal to effect a ratio of the energy equivalent pressure to the mean arterial pressure of greater than 1.0; and
        adjust, during the extracorporeal treatment, the pulse parameter in dependence on the ECG signal.

18. The system according to claim 17, further comprising a membrane oxygenator and/or a membrane fan.

19. The system according to claim 17, further comprising an ECG apparatus communicatively connected to the interface.

20. The system according claim 17, wherein the non-occlusive blood pump and/or control unit are configured to be arranged extracorporeally.

21. The system according to claim 17, further comprising at least one cannula for inserting the arterial patient access into the patient and one cannula for inserting the venous patient access into the patient.

22. The system according to claim 21, wherein the at least one cannula for inserting the arterial patient access is formed for insertion into the aortic region or into the a. femoralis and/or the cannula for inserting the venous patient access is formed for insertion into the right atrium or into the vena cava.

23. A method for controlling a non-occlusive blood pump of an extracorporeal circulatory support, the method comprising:
    receiving, during an extracorporeal treatment, a flow value of the extracorporeal circulatory support;
    receiving, during the extracorporeal treatment, a measurement of an arterial pressure and an ECG signal of a supported patient over a predetermined period of time;
    determining, iteratively during the extracorporeal treatment, a mean arterial pressure of the extracorporeal circulatory support or of the supported patient from the measurement of the arterial pressure and an energy equivalent pressure from the flow value and the arterial pressure;
    determining, iteratively during the extracorporeal treatment, a required value of at least one pulse parameter of the blood pump from the mean arterial pressure, the energy equivalent pressure, and the ECG signal to effect a ratio of the energy equivalent pressure to the mean arterial pressure of greater than 1.0; and
    adjusting, during the extracorporeal treatment, the pulse parameter in dependence on the ECG signal.

24. The method according to claim 23, wherein an R-wave is determined from the ECG signal and the pulse parameter is adjusted at a predetermined time point after the R-wave.

25. The method according to claim 23, wherein the at least one pulse parameter is selected from a pulse amplitude, a pump speed, a pump speed change per unit time, a pulse duration, a systolic pump duration, a diastolic pump duration, a drive wheel deceleration, a drive wheel acceleration, and/or an averaged pump flow.

26. The method according to claim 23, wherein a diastolic phase and systolic phase of the heart of the supported patient are determined from the ECG signal and at least the pulse duration is adjusted such that it ends before the systolic phase.

27. The method according to claim 23, wherein the required value of the pulse parameter is further determined in dependence of a predetermined target value or a predetermined target percentage of the energy equivalent pressure.

28. The method according to claim 23, wherein the non-occlusive blood pump is fluidly connected to a membrane oxygenator.

29. The method according to claim 23, wherein the method is carried out non-invasively.

30. The method according to claim 23, wherein the method is carried out with a control unit.

\* \* \* \* \*